United States Patent
Kaulbach et al.

(10) Patent No.: US 9,715,693 B2
(45) Date of Patent: Jul. 25, 2017

(54) METHOD AND APPARATUS FOR DISTRIBUTING ADVERTISEMENTS USING SOCIAL NETWORKS AND FINANCIAL TRANSACTION CARD NETWORKS

(75) Inventors: Peter D. Kaulbach, Oakville (CA); Mostafa Sabet, Greenwich, CT (US); Joshua Kessler, Danbury, CT (US); Stephen Toner, Douglas (IE); Stephen Hendrix, St. Charles, MO (US); Matthew Richard Stocke, Richmond Heights, MO (US); Adam Kenneth Hosp, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1108 days.

(21) Appl. No.: 13/293,870

(22) Filed: Nov. 10, 2011

(65) Prior Publication Data
US 2013/0124283 A1 May 16, 2013

(51) Int. Cl.
G06Q 10/00 (2012.01)
G06Q 30/02 (2012.01)

(52) U.S. Cl.
CPC ............. *G06Q 30/02* (2013.01); *G06Q 10/00* (2013.01)

(58) Field of Classification Search
USPC ..................................................... 705/14.64
See application file for complete search history.

(56) References Cited

U.S. PATENT DOCUMENTS

| | | | |
|---|---|---|---|
| 6,332,127 B1 * | 12/2001 | Bandera et al. | 705/14.55 |
| 7,774,229 B1 | 8/2010 | Dernehl et al. | |
| 8,195,163 B2 * | 6/2012 | Gisby et al. | 455/435.1 |
| 2005/0060417 A1 | 3/2005 | Rose | |
| 2006/0100927 A1 | 5/2006 | Zormati | |
| 2006/0212355 A1 | 9/2006 | Teague et al. | |
| 2007/0078761 A1 * | 4/2007 | Kagan et al. | 705/39 |

(Continued)

FOREIGN PATENT DOCUMENTS

EP 1 543 546 B1 8/2007
KR 10-2009-0127443 A 12/2009

(Continued)

OTHER PUBLICATIONS

Shojima et al. A method for mediator identification using queued history of encrypted user information in an incentive attached peer to peer electronic coupon system. 2004 IEEE International Conference on Systems, Man and Cybernetics. Oct. 10-13, 2004.*

(Continued)

*Primary Examiner* — Beth V Boswell
*Assistant Examiner* — Folashade Anderson
(74) *Attorney, Agent, or Firm* — Buchanan Ingersoll & Rooney PC

(57) ABSTRACT

An exemplary method for distributing an offer to a mobile device includes identifying a location of a first mobile device, identifying offer preferences for a user of the first mobile device, and distributing the offer to the first mobile device. The offer is an offer for the purchase of goods or services, the offer meets the offer preferences of the user of the first mobile device, and the offer is encoded with a first offer identifier corresponding to the user of the first mobile device.

22 Claims, 9 Drawing Sheets

(56) References Cited

U.S. PATENT DOCUMENTS

| | | | |
|---|---|---|---|
| 2007/0150339 A1* | 6/2007 | Retter | G06Q 30/02 |
| | | | 705/14.26 |
| 2008/0052169 A1* | 2/2008 | O'Shea | G06Q 20/10 |
| | | | 705/14.17 |
| 2008/0262928 A1* | 10/2008 | Michaelis | 705/14 |
| 2009/0076912 A1* | 3/2009 | Rajan et al. | 705/14 |
| 2010/0088170 A1 | 4/2010 | Glore, Jr. | |
| 2010/0125490 A1 | 5/2010 | Kiciman et al. | |
| 2010/0257038 A1 | 10/2010 | Shipley | |
| 2011/0029364 A1 | 2/2011 | Roeding et al. | |
| 2011/0093318 A1 | 4/2011 | Guday et al. | |
| 2011/0196725 A1 | 8/2011 | Malcolmson et al. | |
| 2011/0246284 A1* | 10/2011 | Chaikin et al. | 705/14.38 |
| 2011/0270618 A1 | 11/2011 | Banerjee et al. | |
| 2012/0130796 A1* | 5/2012 | Busch | 705/14.36 |
| 2016/0019572 A1* | 1/2016 | Ekselius | G06Q 30/0211 |
| | | | 705/14.13 |

FOREIGN PATENT DOCUMENTS

| | | |
|---|---|---|
| KR | 10-2010-0025578 A | 3/2010 |
| WO | WO 01/20566 A1 | 3/2001 |
| WO | W 2008/008278 A2 | 1/2008 |
| WO | WO 2011/046849 A2 | 4/2011 |

OTHER PUBLICATIONS

Notification of Transmittal of the International Search Report (Form PCT/ISA/220 and PTO/ISA/210) and the Written Opinion of the International Searching Authority (Form PCT/ISA 237) dated Feb. 28, 2013, issued in corresponding International Application No. PCT/US2012/058742. (11 pages).

* cited by examiner

METHOD AND APPARATUS FOR DISTRIBUTING ADVERTISEMENTS USING SOCIAL NETWORKS AND FINANCIAL TRANSACTION CARD NETWORKS

FIELD

The present disclosure relates to distributing advertisements to mobile devices, specifically offers distributed to mobile devices such as smart phones encoded with an offer identifier.

BACKGROUND

Retailers, restaurants, and other service providers advertise in a variety of ways in order to reach consumers. Commonly used methods of advertising include television, radio, billboards, newspapers, magazines, and Internet advertising. A problem arises with these traditional forms of advertisement, as the retailer does not necessarily know the identity of the customers they are attempting to reach. A retailer who places an advertisement of an offer in print media, such as a newspaper, only has the knowledge that they are reaching a broad group of people with a broad array of demographics and interests. Until a particular consumer has actually entered the store and redeemed the advertised offer, the retailer may not be able to identify their targeted consumer. At that point, the consumer has already made their purchase and so there is less opportunity to tailor incentives or offers to that particular consumer. For instance, the retailer might produce coupons at the point of sale (POS) and, if the customer is a "member" of that merchant's affinity program, the coupon may even be based on the customer's purchase history. The intent, however, is only to bring that one customer back and not bringing customers to the merchant initially.

There is a perceived opportunity to improve the shopping experience of consumers, while providing retailers with more efficient and effective advertising mechanisms. For instance, there is a perceived opportunity to distribute offers to consumers based on the consumer's geographic location and social network optionally in conjunction with credit card processing systems, wherein the offer is encoded with an offer identifier that assists in identifying the customers who receive, forward and/or redeem the offer.

SUMMARY

The present disclosure provides a description of methods and computer architecture to enable those skilled in the art to implement a system that distributes offers encoded with an offer identifier to a consumer, perhaps using the customer's mobile device, facilitating redemption of the offer and identifying who the offer was sent to initial, who forwarded it on, and who redeemed it. Awards, financial and otherwise, can be given to the users for certain activities as incentives.

An exemplary method for distributing an offer to a mobile device includes identifying a location of a first mobile device, identifying offer preferences for a user of the first mobile device, and distributing the offer to the first mobile device. The offer may be an offer for the purchase of goods or services, the offer meets the offer preferences of the user of the first mobile device, and the offer is encoded with a first offer identifier corresponding to the user of the first mobile device. The offer may be forwarded to people designated by the user, and the offer identifier updated to track the offer to reward people for the referrals and other activities.

The user profile may be based on user surveys, user opt-in monitoring, for instance, on social media, Internet activity or purchase history, and third party sourced demographic information. For instance, the user might opt-in to having credit, debit or other financial transaction card use monitored, insofar as to purchase activity, financial transaction card activity may well be the most authoritative source of information on the user's consuming interests.

By providing a mechanism for users to refer offers on to friends or otherwise connected via social networks, including a social network formed around the presently disclosed system, a merchant can send out an offer to a target audience, and the people who receive it can then forward it on to friends who may be interested in the offer. Whether hot buns at the local bakery going to friends and colleagues in the geographic area, or a special deal on camera supplies from an virtual retailer to a virtual camera club, the offer can create localized (geographic or virtual) interest, and a frenzy of activity. Rewarding referrals with recognition, discounts or other forms of reward may incentivize users to make referrals, and the social network may provide disincentives for overloading people with offers that they may or may not be interested.

Further, by providing the merchant with the ability to initiate his or her own offer, particularly if through an intuitive, user friendly and/or customized computer interface, special offers can be thought of and distributed quickly for quick response (e.g., hot buns at a discount for the next hour) by an interested and motivated audience (e.g., people in the nearby office complex).

An exemplary system for distributing an offer to a mobile device includes a server configured to: store offer preferences of a user of the mobile device, identify a location of the mobile device, and distribute the offer to the mobile device. The offer may be an offer for the purchase of goods or services, the offer meets the offer preferences of the user of the mobile device, and the offer is encoded with an offer identifier corresponding to the user of the first mobile device. The offer may be forwarded to people designated by the user, and the offer identifier updated to identify the referring party to reward people for the referrals. The offer identifier, when the offer is redeemed, can then be used to reward the person or people who forwarded the offer to someone who redeemed it.

A system for receiving an offer includes a mobile device configured to receive an offer. The offer may be an offer for the purchase of goods or services, the offer meets the offer preferences of the user of the mobile device, and the offer is encoded with an offer identifier corresponding to the user of the first mobile device.

BRIEF DESCRIPTION OF THE DRAWING FIGURES

Further areas of applicability of the presently disclosed offer referral and redemption system and method will become apparent from the detailed description provided hereinafter. It should be understood that the detailed description of exemplary embodiments are intended for illustration purposes only and are, therefore, not intended to necessarily limit the scope of the invention(s) recited in the claims appended hereto.

DETAILED DESCRIPTION

Figure 1:
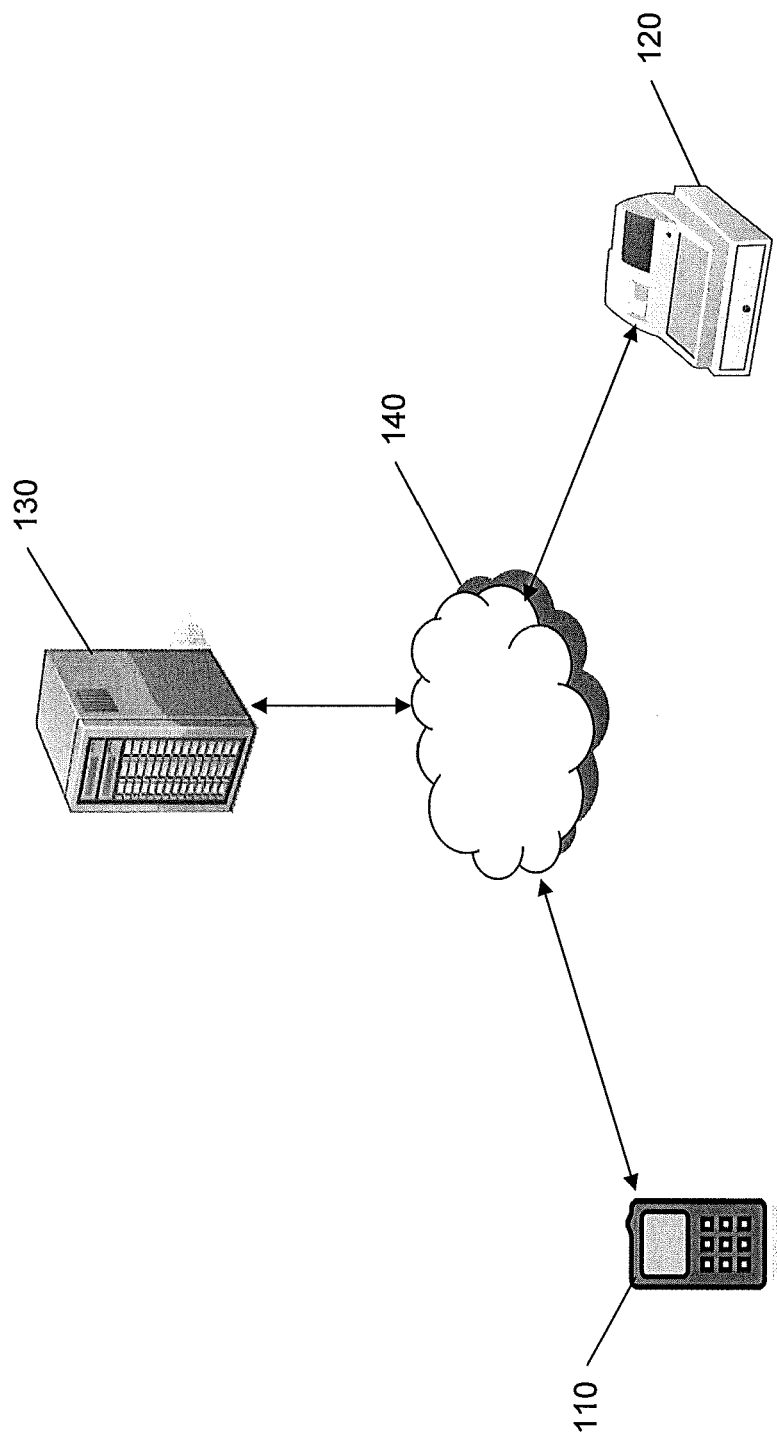
FIG. 1 is a block diagram illustrating an offer distribution system according to exemplary embodiments.

With reference to FIG. 1, the present disclosure includes methods and systems for the distribution of an offer to a mobile device. The system may include a mobile device 110, a merchant device 120, and a server 130, with nearly any suitable communications network 140 such as the Internet, a private network, a virtual private network, cellular networks or mixtures thereof, whether or not the network has wire, fiber optic and wireless communication links, as explained in more detail below. Each of the mobile device 110, the merchant device 120, and the server 130 may be configured to connect to the network 140, but direct communications are also envisioned, particularly between the mobile device 110 and the merchant device 120 and more particularly using non-contact communications, such as but not limited to optical recognition of codes (e.g., bar codes, QR codes or nearly any other optically machine readable code), near field communications such as ZigBee, Bluetooth or nearly any other electromagnetic based communication, acoustically based communication (whether audible by humans or otherwise), or magnetically (e.g., by dynamic magnetic strip), as explained in more detail below.

Figure 3:
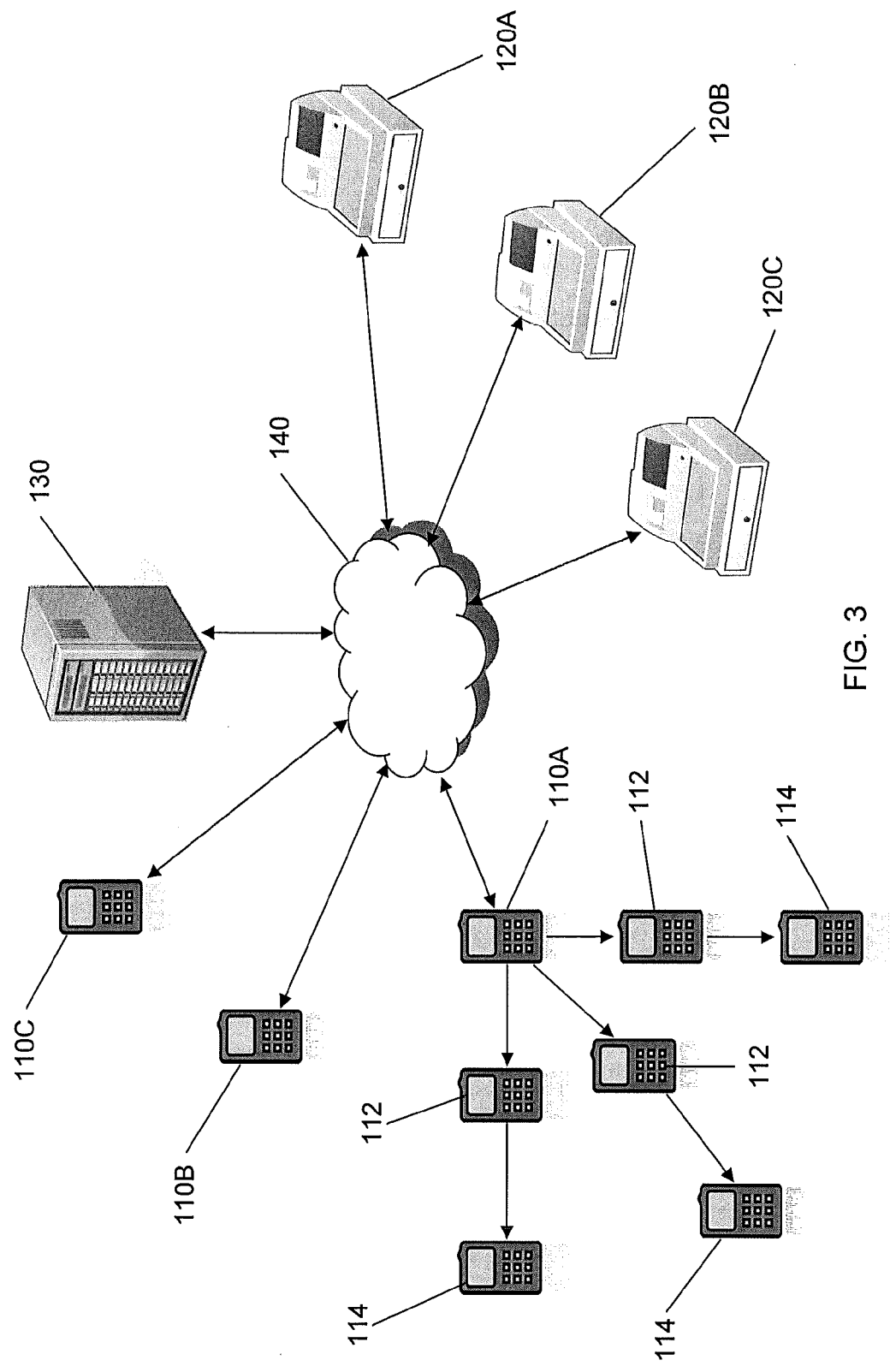
FIG. 3 is a block diagram illustrating an offer distribution system featuring multiple users and merchants according to exemplary embodiments.

It will be apparent to persons having skill in the relevant art(s) that the system may be configured to include multiple mobile devices and multiple merchants. For example, with reference to FIG. 3, the system may include mobile devices 110A, 110B, and 110C each configured to connect to the network 140, but many, many more are also envisioned. Additionally, the system may include multiple merchants 120A, 120B, and 120C also configured to connect to the network 140. The system may further include second mobile devices 112, and third mobile devices 114 of different types, categories or geographic location. The mobile device 110 can any mobile communication device configured to perform the functions as discussed herein, such as a cellular phone, smart phone, tablet computer, PDA, etc. It can also be a less mobile device such as a desktop computer, which would be useful in environments where a frenzy of activity can occur in virtual space, either in the context of Internet shopping or in a virtual world, for example.

The Offer

The mobile device 110 may be configured to receive the offer, which may be transmitted to the mobile device 110 by the server 130. The offer may be transmitted to the mobile device 110 through the network 140. In some embodiments, the server 130 may be a dedicated offer provider. Exemplary configurations of the network 140 are described below. The offer may be received using an application program (application) on the mobile device 110. The application may run off of hardware, software compiled on a general purpose processor to make it a specific purpose computer following the algorithms identified herein, or any combination thereof. The application may also be required to store data, either locally on the mobile device 110, or externally through external databases or on the cloud, which may be access through the network 140. Though exemplary embodiments discussed herein are with reference to the mobile device 110 including the application, it will be apparent to those having skill in the relevant art(s) that the application is not required.

An offer may also be saved to a user's personal offer account. The user's personal offer account may be accessed by the mobile device 110 (e.g., through the application), or may be accessed without the mobile device 110 (e.g., through a website). The user's personal account may indicate the status of an offer (e.g., available, expired, redeemed, etc.) and may provide an option for the user to identify an offer as having been redeemed. Offers that have been redeemed or that have expired may continue to remain accessible to a user (e.g., indefinitely or for a predetermined period of time) and enable the user to review the offer, share the offer on a social network, or refer the offer to a friend, for example. Offers may also be printed from a user's personal offer account without the use of the mobile device 110 (e.g., through the website), which may then be taken to the merchant device 120 and redeemed.

The offer may be for the purchase of goods or services. The offer may be an advertisement for a good or service, or may be an offer for purchasing the goods or services at a discount (e.g., a coupon). Offers may be time-sensitive, such as a bakery offering its goods at a discount until closing time in an effort to sell inventory it would otherwise dispose of, for instance. Offers may also be restricted to a specific number of redemptions, such as an offer for a discount or a free item for the first one hundred people to arrive at the store. Offers may also be associated with a particular merchant, such as a specific retailer or a specific store owned by a retailer. In some embodiments, offers associated with a particular merchant may only be distributed to mobile devices that are proximate to that particular merchant. Other types of offers that may be used with the systems and methods disclosed herein will be apparent to persons having skill in the relevant art(s).

In some embodiments, offers may be provided by a dedicated offer provider. In other embodiments, an offer may be provided by the merchant device 120. In additional embodiments, offers may be submitted by users through the mobile device 110 using the application. In another embodiment, offers may be submitted by users through a website. User-submitted offers may require additional validation (e.g., by other users or by the associated merchant device 120). That is, if a user submits an offer he or she has seen advertised, other users may be asked to verify the information either as a direct effort or by reporting attempts to use it. Alternatively or additionally, the server 130 may be programmed to inquire of the merchant (with or without human intervention) to verify the offer and to offer to distribute it using the system disclosed herein. In one embodiment, the merchant may be given the opportunity to sponsor or advertise the user-submitted offer. In some embodiments, user-submitted offers may only be distributed by referral from one user to another.

The offer identification may be in the form of machine readable code (e.g., a bar code, QR code, etc.), a unique number to be entered by the merchant device 120 upon redemption, or any other form suitable for use in the systems and method as disclosed herein. The offer may also be encoded with an offer identifier corresponding to the user of the mobile device 110 that receives the offer. The encoding may be done when the offer is distributed (e.g., at the server 130), or at the mobile device 110 when the offer is received. If an offer is referred from the mobile device 110 to the second mobile device 112, the offer may be further encoded with a second offer identifier corresponding to the user of the second mobile device 112. The further encoding may be performed by the server 130, the mobile device 110, or the second mobile device 112. If the offer is referred continuously, additional offer identifiers may be further encoded in the offer.

The encoding of an offer identifier in the offer may provide assistance in redemption and attribution of the offer, for example. When an offer is redeemed, the original user to whom the offer was distributed, the user of the mobile device 110, may receive an incentive for referring an offer that was redeemed, as described in more detail below. In existing offer systems, an offer may be tracked by a server at each referral to ascertain the original offeree. Tracking an offer requires time, system resources, and may require continuous or frequent communication with the server 130 when an offer is referred from one mobile device to another. However, by encoding the offer with an offer identifier, such communication for tracking becomes unnecessary. When an offer is referred from the mobile device 110 to the second mobile device 112, it may be encoded with a second offer identifier by either mobile device, without contacting the server 130. When the offer is redeemed, it can be properly attributed by decoding the offer identifiers, without needing to track the offer.

Offer Preferences

Figure 2:
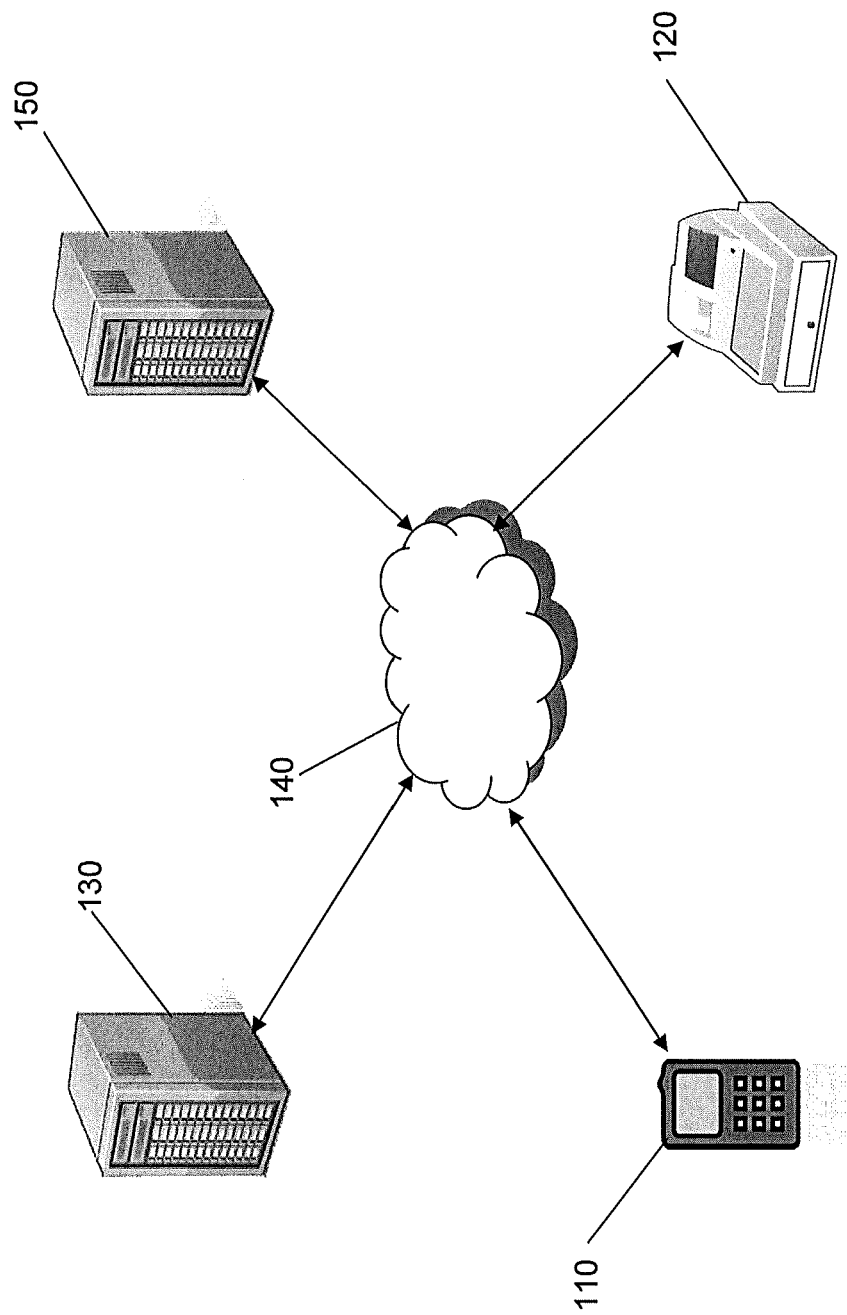
FIG. 2 is a block diagram illustrating an offer distribution system including a transaction server according to exemplary embodiments.

With reference to FIG. 2, an exemplary system for the distribution of an offer to the mobile device 110 may include the transaction server 150.

The offer may be distributed to every mobile device, but may also be restricted to specific mobile devices based on a user's offer preferences. The types and amount of data that may be considered for a user's offer preferences may be contingent upon the user's consent to provide such information Offer preferences may include factors such as demographic information (e.g., gender, age, income, background, religion, political affiliation, marital status, identified interests, etc.), location information (e.g., proximity to a merchant, geographic location, etc.), social information (e.g., friend suggestions, friend purchases, user groups, likes, etc.), or a user's purchasing history. This information may be stored in the server 130, but may also be stored in one or more databases that may be external to, or included within, the server 130 or in combination thereof. Some of such information may be provided by a third party, the providing of which may be contingent upon the user's consent. Further, the data may be augmented with similarity data, such that if a user likes product or service X, he may like similar product or service Y.

A user may elect to include using their purchasing history for consideration in the distribution of offers. The user's purchasing history may be obtained, for example, through the transaction server 150. The transaction server 150 may be an issuing bank, an acquiring bank, a combination of an issuing and acquiring bank, a financial transaction system, or an offer redemption service, for example. In an exemplary embodiment, the transaction server 150 is a financial transaction system that facilitates the consumer financial transaction between the user of the mobile device 110 and the merchant device 120. The transaction server 150 may track a user's purchases, including purchases made without offers distributed to the mobile device 110. The information may also be obtained from the merchant device 120 at the point-of-sale (POS) through the use of software, hardware, or a combination thereof, or from a separate device that may be placed at the merchant device 120 that may communicate directly with the server 130. Such information may be stored with offer preference information on the server 130, and may be particularly useful for merchants having local customers in that the database may be very specialized and proprietary to the merchant.

Offers that are distributed may be designated based on a user's purchasing history. For example, if a user of the mobile device 110 regularly purchases sports equipment and sport-related items, offers related to sports may always be distributed to the user. Conversely, if a user never purchases sports equipment or related items, and has declined offers for such items, offers related to sports may no longer be distributed to the user. If a user of the mobile device 110 regularly purchases sports equipment manufactured by a specific brand, but that specific brand does not participate in the distribution of offers, the user may be distributed offers by a competing brand that promises discounts or other incentives.

A user's purchasing history may also be taken into account in combination with other demographic information. For example, if a user has a high disposable income and has a purchasing history that shows a trend of buying high end designer clothing, the user may receive offers for high end clothing. If these offers are accepted, the server 130 may continue to distribute these types of offers to the user. If at some point it is detected that the consumer has less disposable income, offers for more affordable items may be distributed instead.

A user may also elect to have their demographic information monitored and be distributed offers accordingly. For example, if it is detected that a user has changed marital status from single to engaged, the user may begin to receive offers for wedding planning services, travel agents, wedding dresses, reception halls, etc. If it is detected that a user has passed a specific age, the user may start receiving age-sensitive offers, such as offers for discounted car insurance once a user has turned 25, or for various senior citizen discounts once a user has turned 55.

A user may elect to have social information taken into account when offers are distributed to them. For example, a user may choose to associate their mobile device 110 with their account on a social networking website (e.g., Facebook, Twitter, a social network based on the present system and service, etc.). Account information on the social networking website may be used for the distribution of offers. For example, if a user has "liked" a specific brand or retailer on that brand or retailer's Facebook, or if a user follows a specific brand or retailer on Twitter, the user may be more likely receive offers from that specific brand or retailer. Similar information corresponding to others in the same social network may also be used. For example, if a friend of the user regularly redeems offers for a specific restaurant, the user may also begin to receive offers for that same restaurant. Other social information that a user may provide or consent to the use of in the distribution of offers may include name, birthday, home town, employer, education, work experience, gender, relationship status, likes, friends, etc.

A user may also browse available offers through the application on the mobile device 110 or through a website. In some embodiments, only offers that meet the user's offer preferences may be available for browsing. Selected offers may be stored in the user's personal offer account, which may be accessed later from a separate location or device. For example, a user may browse for available offers on a website, select an offer, and then produce the offer at the merchant device 120 at a later time using their mobile device 110.

Additionally, a user may elect to have their offer preferences take into account their browsing history or other behavior on the application or website. For example, if a user who does not regularly receive offers for sports equipment shows a pattern of browsing sports equipment offers in the area, the user may begin to receive sports equipment offers. Other behavior that may be taken into account includes offers saved, offers shared, offers redeemed, offers viewed, offers created, changes in preferences, offer search data, etc.

Location Identification

Figure 4:
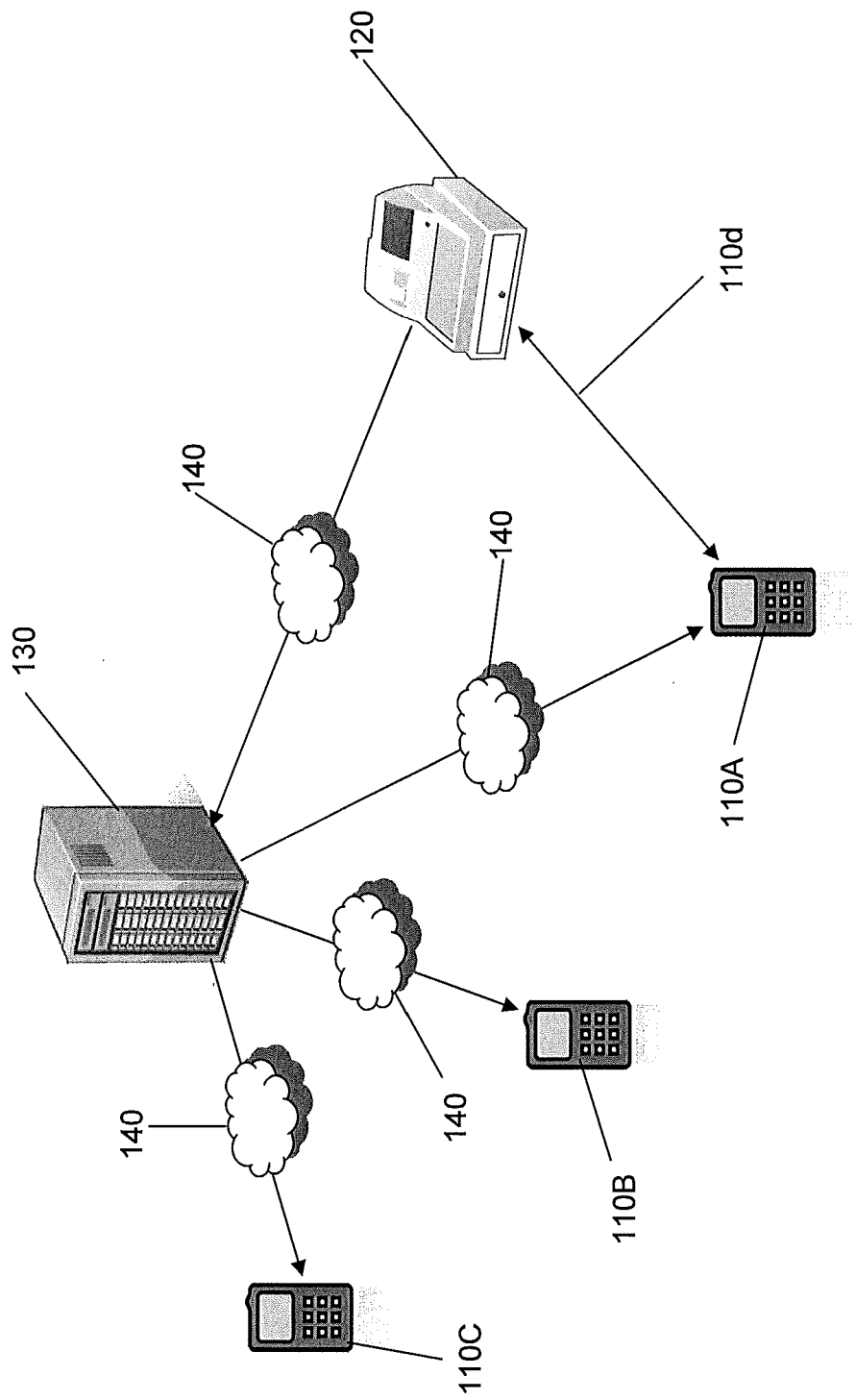
FIG. 4 is a block diagram illustrating an offer distribution system including offer redemption according to exemplary embodiments.

With reference to FIG. 4, an exemplary system for the distribution of an offer to the mobile device 110 may include identification of the location of the mobile device 110. In some embodiments, the location of the mobile device 110 may be identified with respect to its proximity, or distance from, the merchant device 120, represented by the distance 110d.

Rather than widely distributing an offer to every user of the system, the merchant device 120 may want to distribute an offer or advertisement only to users of mobile devices that are physically in a position to take advantage of the offer. For example, the mobile devices 110A, 110B, and 110C in FIG. 4 may each be in a different geographic location. The merchant device 120, knowing many consumers will not go significantly out of their way to stop in their place of business, may choose to distribute offers only to those mobile devices that are within a specific distance, the distance 110d. Therefore, the offer may be distributed to the mobile device 110A, but not the mobile devices 110B and 110C. The user of the mobile device 110A, being close to the merchant device 120, may be influenced by the offer and their proximity to the merchant device 120 to stop by, thus gaining the merchant device 120 business.

It will be apparent to those having skill in the art that the distance 110d at which an offer may be distributed may vary from offer to offer. For example, an extremely enticing offer may be distributed in a broader area as consumers may be more willing to go out of their way to redeem the offer. The distance 110d may also vary from user to user. If one user has a history of going ten miles away to redeem an offer, their respective distance 110d may be ten miles. If a different user has consistently refused to travel more than two miles to redeem an offer, then that user may have a shorter respective distance 110d. This information may also be taken into account with other purchasing history information. For example, if a user only accepts most offers when they are within a mile of the offering merchant, but regularly accepts offers on sports equipment regardless of their proximity to the merchant, offers may be distributed to the user accordingly.

The distance 110d from the merchant device 120 at which an offer may be distributed to a mobile device may also vary from merchant to merchant. Each merchant may employ different marketing strategies, may have different target markets, and may have had different success with offers, and therefore may elect to have their offers distributed on different scales. For example, a restaurant may not often have consumers redeem an offer if the consumer received it when they were over three miles away, often deciding to go to a closer restaurant. On the other hand, a retail store that offers specialized goods with its closest competition over twenty miles away may wish to advertise to every consumer in a fifteen mile range, knowing that for most users they are the closest choice. This system is particularly appropriate for micro-marketing, for example, within a mall or plaza.

An offer may also be distributed to the mobile device 110 based purely on geographic location, without respect to their distance 110d from the merchant device 120. For example, a restaurant near an exit on a major interstate may have their offer distributed to any mobile device that approaches the exit from either direction. Similarly, a tourist attraction may have an advertisement for their attraction distributed to mobile devices that stop at a welcome center a great distance away. In other instances, an offer may be distributed to the mobile device 110 when it is in very close proximity to the merchant device 120. In one embodiment, an offer may be distributed to the mobile device 110 when it actually enters the front door of the merchant device 120. In another embodiment, an offer for a specific item may be distributed to the mobile device 110 only when it approaches a specific department that offers the item, inside of the store of the merchant device 120. In other embodiments, offers may be distributed to the mobile device 110 when it approaches a competing merchant.

There are a variety of systems and methods that may be used in order to locate the mobile device 110. Various systems that may be used to locate the mobile device 110 include, for example, the Global Positioning System (GPS), Wi-Fi, radio-frequency identification, Bluetooth, magnetic field detection, sound-based detection, bar codes (e.g., one-dimensional bar codes, or two-dimensional bar codes, such as a QR code, etc.), or device recognition (e.g., MAC address recognition).

To determine when the user is crossing or has crossed a physical threshold, e.g. a store entrance, various techniques may be employed, as described in further detail below, including rapid degradation of GPS signals, rapid improvement of the WiFi signal, a combination of GPS signal degradation and WiFi signal improvement, a sudden decrease of location data accuracy, magnetic field detection, RF signal detection, barcode recognition, recognition of device IDs, manual data entry, and/or other methods.

In one embodiment, the rapid degradation of GPS signals is used. GPS technology, including systems integrated mobile devices, such as the mobile device 110, typically determines location by analyzing data from several (e.g. four or more) satellites which are in a line-of-sight (a e.g., a visible or unobstructed view) to the mobile device 110. When a user of the mobile device 110 walks into the store of the merchant device 120, the mobile device 110 frequently loses contact with one or more of the satellites from which signals could previously be received (e.g. at least two out of four satellites) due to signals blocked by the walls and roof or other structures. This rapid degradation of the GPS signal may serve as a determination the mobile device 110 has entered the merchant device 120, for example in combination with the previous proximity to the store location, and other data.

Another possible trigger is the sudden availability of, or rapid improvement of, a WiFi signal. In addition to or instead of GPS, many mobile devices include WiFi transceivers. For in-building locations of WiFi networks, such as stores (e.g., the merchant device 120), that require passing a physical threshold such as a wall or a door, passing through that threshold can result in a rapid improvement or strengthening of the WiFi signal. A WiFi transmitter for the merchant device 120 can broadcast a specific SSID (e.g., network name). Thus, the mobile device 110 can detect specific merchant WiFi transmitters. In one embodiment, the inventive system can detect the combination of general location information about the user, rapidly deteriorating GPS signals, and concurrent rapidly improving merchant WiFi signals, leading to higher accuracy of determination that the user of the mobile device 110 has entered the merchant device 120, or some other designated area, such as a specific department in the merchant device 120, or the entrance to a shopping mall where the merchant device 120 is located.

Another method for detecting a consumer within a store is the detection of a change in the ambient magnetic field. A magnetic field can be created in a location or store (e.g., the merchant device 120), through a magnet, or through an electrically induced field. This magnetic energy can be detected by the mobile device 110 with an included magnetometer. In one embodiment, the magnetic field can be a sequence of magnetic field strengths or polarizations that encodes a merchant identification. Such a magnetic field typically gets weaker immediately outside of the merchant device 120 or will not be detectable for the mobile device 110 at all once leaving, due to the general rapid degradation of magnetic fields over short distances.

In other embodiments, other location detection methods may be used including cellular triangulation. Cellular triangulation uses data from cellular towers, to locate the position of a cellular phone (e.g., the mobile device 110). In another embodiment, Bluetooth transceivers may be used. Consumers can also be identified through Bluetooth technology running both in the merchant device 120 and in the mobile device 110. As the mobile device 110 enters in the front door of the merchant device 120, the Bluetooth on the mobile device 110 syncs with the Bluetooth network enabled in the merchant device 120, and an offer may be distributed to the mobile device 110 accordingly. Other RF signals that the mobile device 110 may detect include near field communication (NFC) signals and radio-frequency identification (RFID) signals which provide proximity detection to determine when a mobile device is close to a corresponding device that may be placed in a relevant location at the merchant device 120.

Accuracy of the geographic location of the mobile device 110 may be improved using accelerometers or compasses included in the mobile device 110. Accelerometers and compasses may be used to determine where a customer is moving within the merchant device 120. Location information may indicate that the customer is in a central area of a store and, based upon the accelerometer or compass information, the direction the customer is moving may be obtained. By comparing the user movement direction to the layout of the merchant device 120, a specific department or area of the store the user is moving towards may be determined.

Communication Network

In many exemplary embodiments, the mobile device 110, the merchant device 120, and the server 130 are each configured to connect to the network 140. The network 140 may be any communication network capable of performing the functions as described herein. For example, the network 140 may be a local area network (LAN), a wide area network (WAN), the Internet, WiFi, a cellular network, fiber optic, cable, or digital subscriber line. The network 140 may also be a combination of networks. For example, the proximity of the mobile device 110 to the merchant device 120 may be established by communication between the mobile device 110 and the merchant device 120 on a WiFi network or a LAN, but the information may be provided to the server 130, which would then transmit an offer to the mobile device 110, through a cellular network.

The mobile device 110 may also communicate to the second mobile device 112 through the network 140 (e.g., a cellular network) or through other means, such as near field communication or infrared. Offers may also be referred from the mobile device 110 to the second mobile device 112 by a physical transfer of data, such as through a Secure Digital (SD) card or by a physical connection between devices.

Offer Referral

Figure 5:
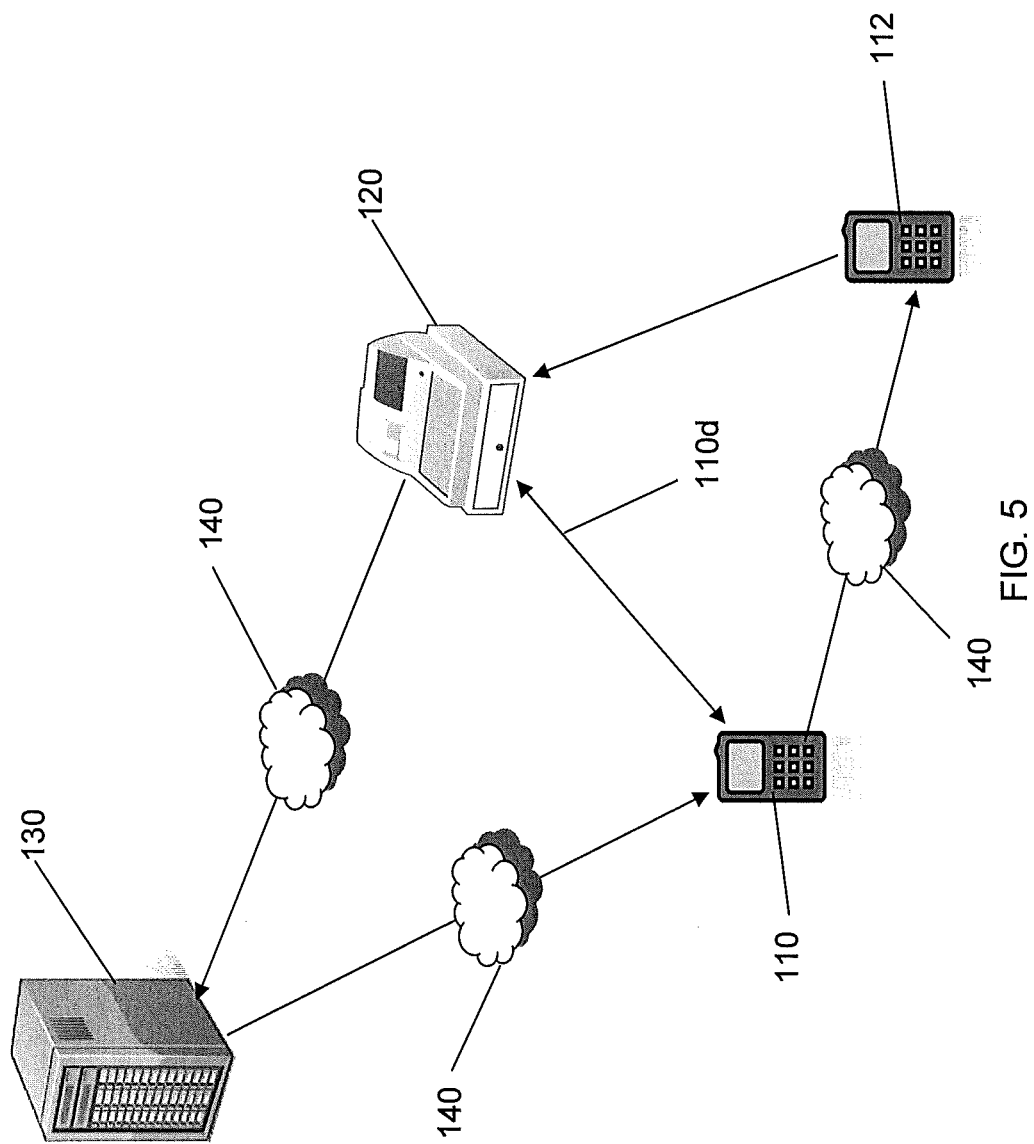
FIG. 5 is a block diagram illustrating an offer distribution system including offer referral and redemption according to exemplary embodiments.

With reference to FIG. 5, an exemplary system for the distribution of offers to mobile devices may include distribution of the offer to the mobile device 110, and then referral of the offer from the mobile device 110 to the second mobile device 112. Methods for the referral of the offer from the mobile device 110 to the second mobile device 112 include, but are not limited to, text messaging (i.e., short messaging service (SMS) messaging, multimedia messaging service (MMS) messaging, etc.), the posting of information to a social networking service (i.e., Facebook, MySpace, Twitter, etc.), or the physical transferring of offer data from the mobile device 110 to the second mobile device 112 (e.g., through a physical connection or removable data such as an SD card).

The user of the mobile device 110 may at times receive an offer that they do not wish to redeem, but they may have a friend or acquaintance that they would like to share the offer with. In such an instance, the user of the mobile device 110 may refer the offer to someone else (e.g., the user of the second mobile device 112), such as through the application program on the mobile device 110. As described above, an offer identifier corresponding to the mobile device 110 is encoded in the offer, either at the point of distribution (e.g., the server 130), or on the mobile device 110 itself (e.g., by the application).

The application may present a user of a variety of methods for referring a received offer to the second mobile device 112. For example, the user may send an SMS message from the mobile device 110 to the second mobile device 112. The user of the second mobile device 112 may receive the message, which may include a link to view the offer in the application. If the second mobile device 112 does not include the application, the link may prompt for installation of the program on the second mobile device 112. The offer, as existing on the second mobile device 112, may be further encoded with an offer identifier corresponding to the second mobile device 112. This offer identifier may be encoded by the mobile device 110 upon transmitting the offer (e.g., by the application when selecting the recipient, or may be encoded by the second mobile device 112 when it receives the offer (e.g., by the application encoding all incoming offers with the device's offer identifier).

The user of the mobile device 110 may also refer an offer to others through the use of a social network (e.g., Facebook, Twitter, etc.). For example, a user may receive an offer, and then publish that offer (e.g., as a wall post on their Facebook profile, or as a tweet on their Twitter profile). In one embodiment, only a description (e.g., not enough information for redemption) of the offer is displayed on the user profile. A referred user who wishes to redeem the offer may be presented with a link, which, when selected, will produce the offer in the application on the referred user's mobile device. In some embodiments, a second offer identifier corresponding to the referred user is encoded in the offer when produced in the application. In one embodiment, if the device does not have the application installed, selecting the link may prompt installation of the application program on the device.

In some embodiments, an offer may be referred both before and after redemption of an offer. In one embodiment, a user can elect that when the user redeems an offer, that offer is referred to friends in a social network. For example, if a user takes advantage of a discount on sports equipment, it may publish a post on that user's Facebook profile stating that they purchased sports equipment at a discount, and providing a referral link. In some embodiments, messages may be sent out to specific referred users when the user redeems an offer. In one embodiment, the referral is only made if the offer meets the target user's offer preferences The application may also include social network functionality. The social network features of the application may also be accessed without the mobile device 110 (e.g., through a website). A user may be able to follow other users, or designate other users as friends. A user may be able to refer offers to followers or friends. Groups of followers or friends may be created, and offers referred to only select groups. Users may have a newsfeed, and may select what is displayed on their respective newsfeeds (e.g., offers viewed, offers shared, offers saved, offers redeemed, etc.). Users may be allowed to post offers to another user's newsfeed. In one embodiment, a user may only be allowed to post offers to another's newsfeed if the other user is a friend or a follower.

Users may also be able to join a category or sub-category of offers. Categories may include geographic location (e.g., Toronto offers), merchant type (e.g., food merchant offers), offer type (e.g., time-sensitive offers), or combination thereof (e.g., food merchants in Toronto). Each category may include a sub-category (e.g., food merchant offers may include restaurant and grocery sub-categories), and each sub-category may include sub-categories (e.g., restaurant offers may include baked good offers, burger offers, or chicken wing offers). Categories may provide subscribers with user-submitted offers that are submitted by other users in the category. Users may also receive recognition for submission of offers to a category. For example, a user who regularly submits offers for chicken wings in Toronto may be designated as the king of Toronto chicken wing offers. Other users may decide to follow the king of a category in order to view the king's shared offers.

Figure 6:
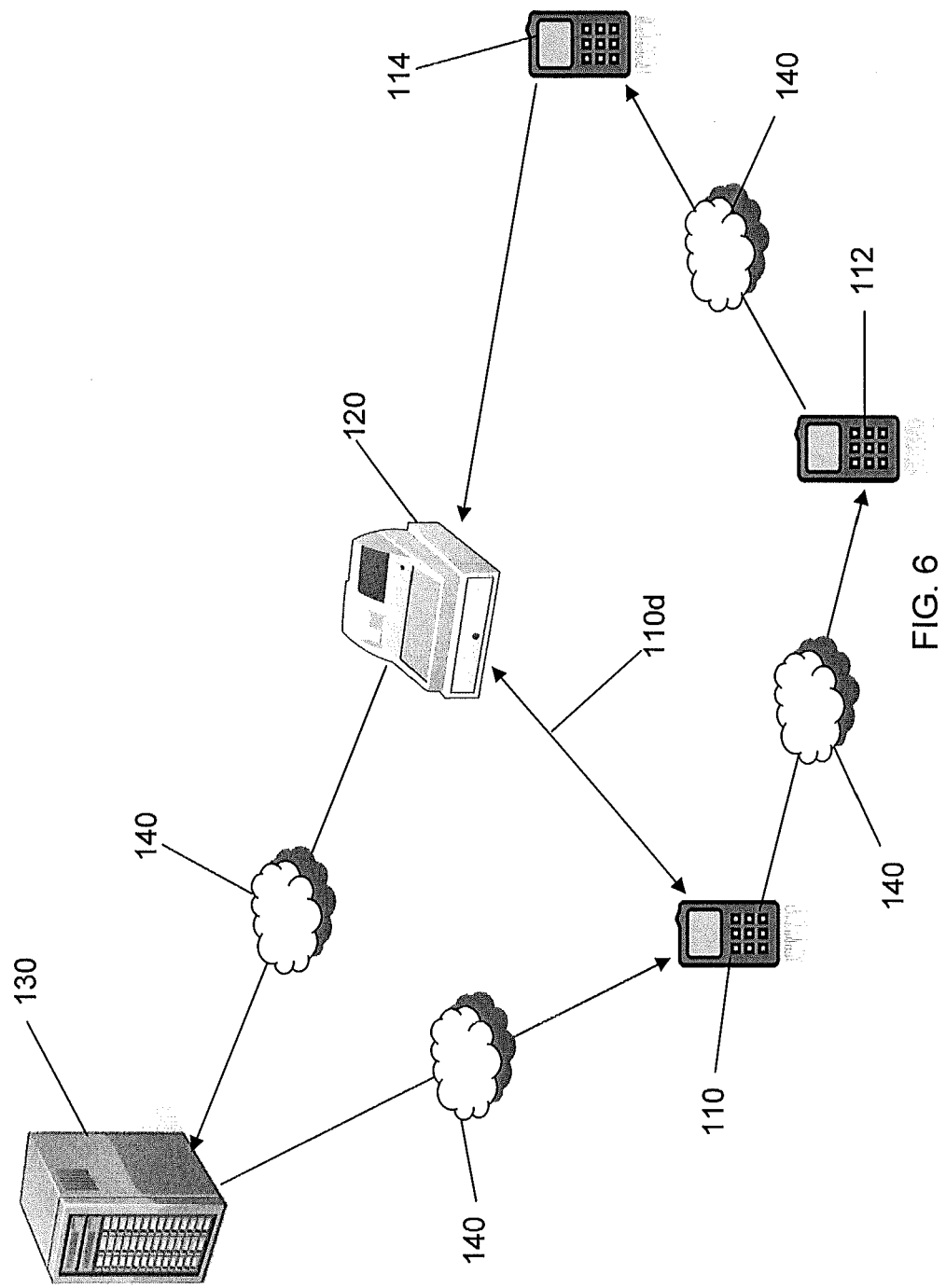
FIG. 6 is a block diagram illustrating an offer distribution system including multiple offer referrals and offer redemption according to exemplary embodiments.

With reference to FIG. 6, an exemplary system for the distribution of offers to mobile devices may also include the referral of the offer from the second mobile device 112 to the third mobile device 114.

Referral of the offer from the second mobile device 112 to the third mobile device 114 may operate in the same fashion as the initial referral of the offer to the second mobile device 112. For example, the offer may be referred to the third mobile device 114 through messaging (e.g., SMS, MMS, etc.) or through social networking (e.g., Facebook, Twitter, etc.). Additionally, the offer may be further encoded with a third offer identifier corresponding to the third mobile device 114. The encoding may be performed in the second mobile device 112 upon transmitting the offer, or in the third mobile device 114 upon receiving the offer.

It will be apparent to persons having skill in the relevant art(s) that offers may be referred indefinitely from the initial mobile device 110 to later mobile devices. In some embodiments, a limit to the referral of an offer may be set. For example, the application may prohibit referral of an offer once it has been received on the third mobile device 114. In one embodiment, the application will not encode any offer identifiers beyond the first offer identifier, resulting in a relative limit on the referral (e.g., in an effort to prevent abuse of the referral process).

Offer Redemption and Incentives

Figure 7:
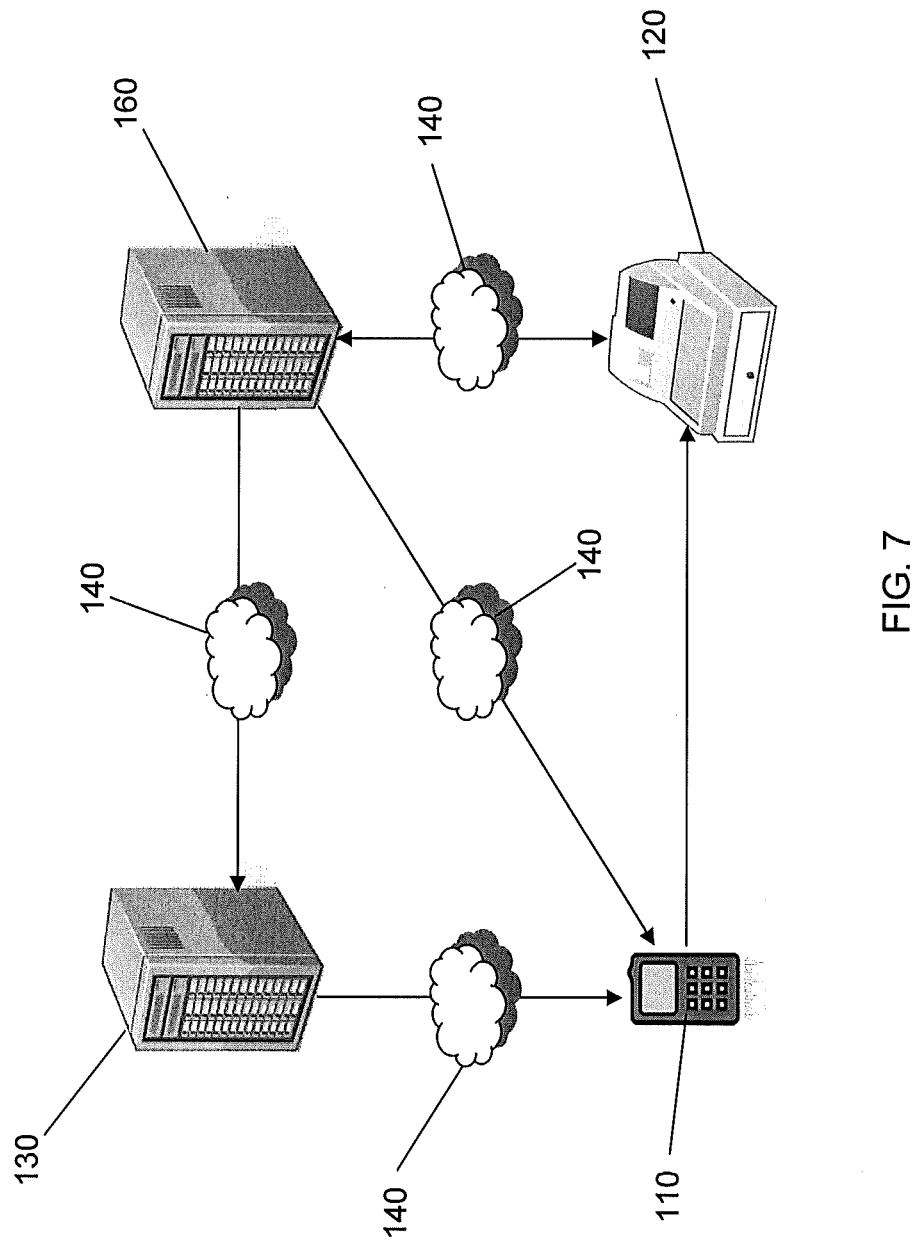
FIG. 7 is a block diagram illustrating an offer distribution system including offer redemption and an offer redeemer according to exemplary embodiments.

FIG. 7 illustrates an ongoing offer distribution system including an offer redeemer 160 as disclosed herein according to an exemplary embodiment.

As illustrated in FIG. 1, the mobile device 110 may receive an offer from the server (offer provider) 130, through the network 140. The offer may be associated with the merchant device 120. The user of the mobile device 110 may visit the merchant device 120 and redeem the offer. The offer may be redeemed as part of a financial transaction that may take place at a merchant point-of-sale (POS). The merchant POS may include software configured to read the offer and decode any encoded offer identifiers. For example, if the offer is represented as a bar code on the mobile device 110 (such as a QR code), the merchant POS may include an optical bar code reader as well as software for decoding the code to obtain any relevant information including encoded offer identifiers. The merchant device 120 may also read offers from the mobile device 110 by other means (e.g., through Bluetooth technology, near field communication, etc.).

In one embodiment, a device separate from the merchant device 120 (not shown) may be used for processing of the offer. The device may be manually engaged by the user or the merchant (e.g., by reading a bar code) or may monitor for offers automatically (e.g., through Bluetooth or WiFi). The device may process the offer and provide a result to the merchant (e.g., total price after redemption of the offer), which then may be entered into the merchant device 120 (manually or automatically). In some embodiments, different offers may be represented in different forms (e.g., some offers as a one-dimensional bar code, other offers as a QR code) corresponding to associated merchant devices 120, or other available separate devices a specific merchant may use.

A merchant may also be notified of an offer through the server 130 and the mobile device 110's location information. For example, the user of the mobile device 110 may enter a merchant's store, and while inside, produce an offer on the mobile device 110 and select an option to redeem the offer. The offer provider 130 may identify the mobile device 110's location and confirm that the mobile device 110 is inside of the merchant (e.g., nearby the merchant device 120). The offer provider 130 may then provide offer details, including the offer identifier(s) to the merchant device 120. In one embodiment, the user of the mobile device 110 may confirm the merchant's receipt of the proper offer details.

In some embodiments, if the user consents, the merchant POS may also be configured to provide purchasing information to the offer provider 130 for consideration in the user's offer preferences for future offers.

As part of the financial transaction, the merchant device 120 may redeem the offer and notify the offer redeemer 160, who may then provide compensation to the merchant device 120 for the redemption of the offer. The offer redeemer 160 may then notify the offer provider 130 that the offer has been redeemed. In one embodiment, the offer provider 130 is notified by the merchant device 120 (e.g., through the merchant POS).

Each mobile device 110 may be associated with an account with the offer provider 130. When the offer provider 130 is notified of redemption of the offer, the redemption may be identified in the account corresponding to the mobile device 110. Identification of the account may be based on any offer identifier(s) encoded in the offer. For example, if the initial offeree redeems the offer, the offer may only be encoded with the offeree's offer identifier. On the other hand, if the offeree referred the offer to a second user, who redeemed the offer, the offer may be further encoded with a second offer identifier corresponding to the second user. In this case, the redemption may be identified in both the accounts corresponding to the first user, as having made the referral, and the second user, as having redeemed the offer.

The offer provider 130 may also notify the user of redemption of the offer (e.g., through the user's mobile device 110 or through the user's personal offer account). In one embodiment, every user corresponding to an offer identifier for an offer may be notified of the redemption of the offer. Notification of redemption of the offer may include notification of offer details, transaction details (e.g., a receipt), or incentive information.

Redemption of an offer may provide a variety of incentives. In some embodiments, an offer may be redeemed by the initial user to receive the offer. The user may receive, in addition to the advantages of the offer itself, a further incentive such as points. Points may be used for, for instance, purchasing goods or services, receiving future, more advantageous offers, or receiving a cash reward. In other embodiments, the initial user may refer the offer to a second user who then redeems the offer. In such an instance, the initial user may receive points for making the referral, and additional points for the second user having redeemed the offer. In one embodiment, if the second user redeems the offer before the initial user does, the value of the offer to the initial user may be increased (e.g., a larger discount on a good or service). In some embodiments; the second user may also receive an incentive upon redemption of the offer. In one embodiment, an incentive is not provided if the offer is a user-submitted offer.

Exemplary Method

Figure 8:
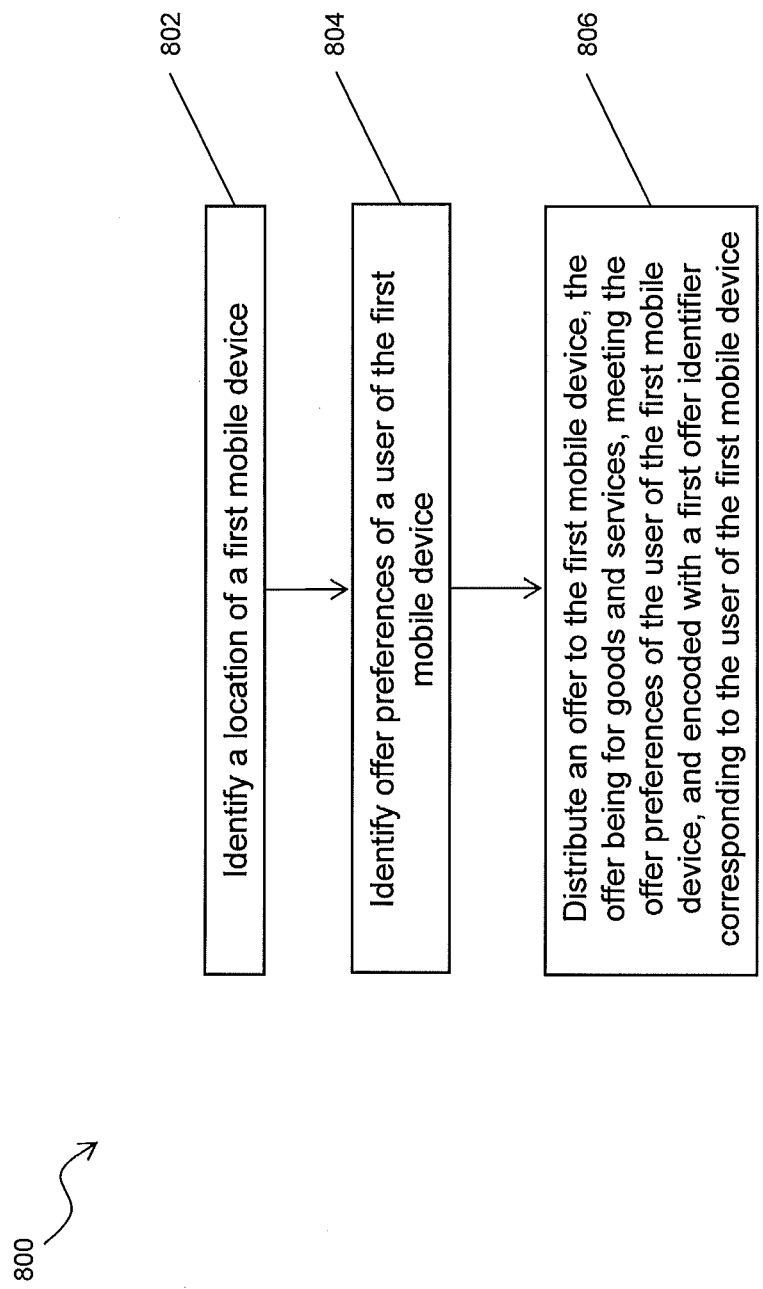
FIG. 8 is a flow chart illustrating a method for distribution of an offer according to exemplary embodiments.
Figure 9:
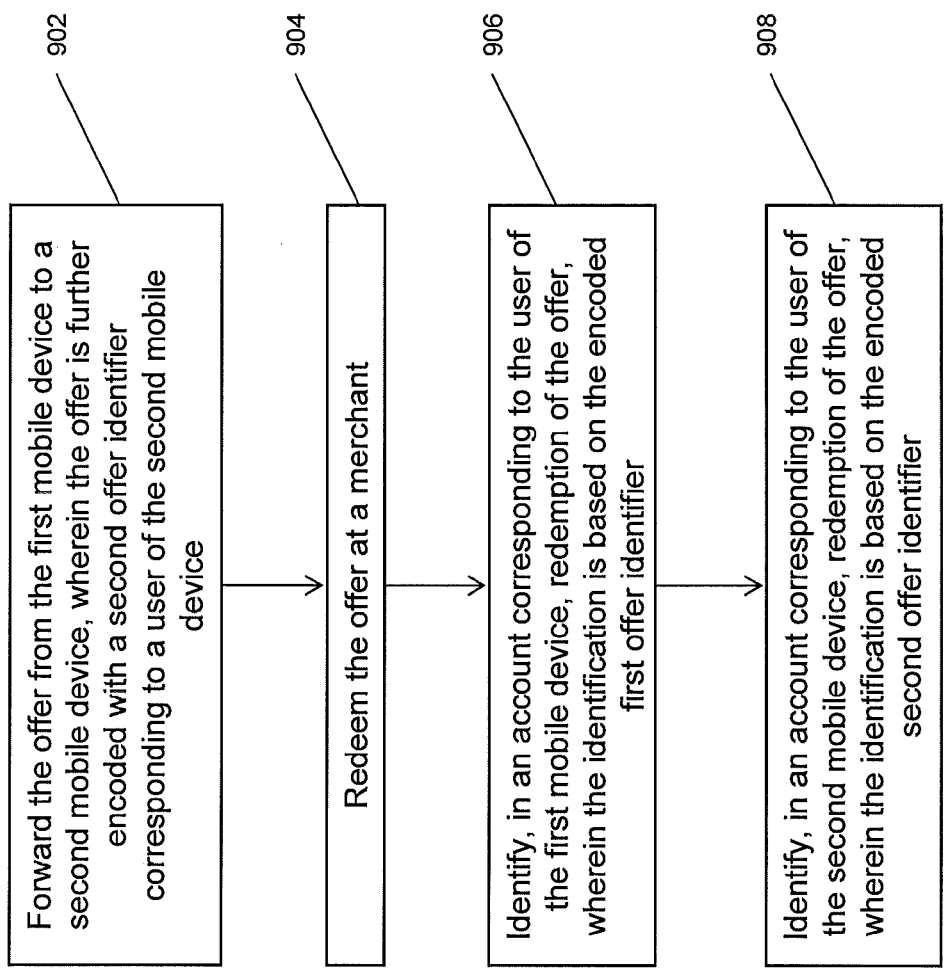
FIG. 9 is a flow chart illustrating additional steps for the method of FIG. 8 according to exemplary embodiments.

FIGS. 8 and 9 are flow charts illustrating exemplary methods for the distribution of an offer to a mobile device and the redemption of the offer according to exemplary embodiments.

FIG. 8 illustrates method 800 for the distribution of an offer to a mobile device. In step 802, the location of a first mobile device (e.g., the mobile device 130) is identified (e.g., by the server 130). In one embodiment, the location is identified using the Global Positioning Service (GPS). In another embodiment, the location is identified using WiFi. In another embodiment, the location is identified using a combination of GPS and WiFi.

In step 804, the offer preferences of a user of the first mobile device are identified. In one embodiment, the offer preferences include demographic information. In a further embodiment, the demographic information includes age, race, gender, income, and residence. In another embodiment, the offer preferences include designation based on the purchasing history of the user of the first mobile device. In one embodiment, the purchasing history includes purchases made without offers.

In step 806, the offer is distributed to the first mobile device, wherein the offer is for goods or services, the offer meets the offer preferences of the user of the first mobile device, and the offer is encoded with a first offer identifier corresponding to the user of the first mobile device. In one embodiment, the offer is represented as a bar code. In a further embodiment, the bar code is a QR code. In one embodiment, the offer is associated with a merchant and the offer is only distributed if the first mobile device is proximate to the merchant. In one embodiment, the encoding is performed by the mobile device.

FIG. 9 illustrates additional steps to the method 800 for distributing an offer to a mobile device.

In step 902, the offer is forwarded from the first mobile device to a second mobile device (e.g., the second mobile device 112), wherein the offer is further encoded with a second offer identifier corresponding to a user of the second mobile device. In one embodiment, the encoding is performed by the mobile device.

In step 904, the offer is redeemed at a merchant. In one embodiment, the offer is redeemed by the user of the second mobile device. In step 906, the redemption of the offer is identified in an account corresponding to the user of the first mobile device, wherein the identification is based on the encoded first offer identifier. In one embodiment, the user of the first mobile device is provided an incentive. In a further embodiment, the incentive is an increase in the value of the offer to the user of the first mobile device. In step 908, the redemption of the offer is also identified in an account corresponding to the user of the second mobile device, wherein the identification is based on the encoded second offer identifier. It will be apparent to persons having skill in the relevant art(s) that step 908 is an optional step.

Where methods described above indicate certain events occurring in certain orders, the ordering of certain events may be modified. Moreover, while a process depicted as a flowchart, block diagram, etc. may describe the operations of the system in a sequential manner, it should be understood that many of the system's operations can occur concurrently or in a different order. For example, although the flow chart illustrating redemption of the offer (FIG. 9) is disclosed and illustrated as being configured to identify redemption of the offer for the first mobile device before identifying redemption for the second mobile device, the second mobile device may be identified prior to the first mobile device, or alternatively they both can be identified concurrently.

Techniques consistent with the present disclosure provide, among other features, systems and methods for distributing offers encoded with offer identifiers to mobile devices. While various exemplary embodiments of the disclosed systems and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for distributing an offer to a computer, comprising:

storing, by a server, offer preferences of a user of a first computer;

identifying, by the server, a location of the first computer;

identifying, by the server, the offer preferences of the user of the first computer; and transmitting, by the server, a message including at least the offer to the first computer, wherein the offer, within the transmission message, (i) is for the purchase of goods or services, (ii) meets the offer preferences of the user of the first computer, and (iii) is encoded with a first offer identifier corresponding to the user of the first computer, and wherein the method further includes:

forwarding the offer from the first computer to a second computer, wherein the offer is further encoded with a second offer identifier corresponding to a user of the second computer;

upon redemption of the offer by a user of the second computer, decoding the encoded first and second offer identifiers; and identifying, by the server, the user of the first computer and the user of the second computer upon redemption of the offer by the user of the second computer and as a result of the decoding of the encoded first and second offer identifiers.

2. The method of claim 1, further comprising:
identifying, in an account corresponding to the first computer, the redemption of the offer, wherein the identification is based on the encoded first offer identifier.

3. The method of claim 1, further comprising:
identifying, in an account of the user of the first computer, the redemption of the offer, wherein the identification is based on the encoded first offer identifier; and
identifying, in an account of the user of the second computer, the redemption of the offer, wherein the identification is based on the encoded second offer identifier.

4. The method of claim 1, wherein the offer is associated with a merchant, and wherein the first computer is proximate to the merchant.

5. The method of claim 1, wherein the offer preferences of the user of the first computer include designation based on the purchasing history of the user of the first computer, received from the transaction server.

6. The method of claim 1, wherein the offer preferences of the user of the first computer include demographic information of the user of the first computer.

7. The method of claim 1, wherein the identification of the location of the first computer includes using the Global Positioning System.

8. The method of claim 1, further comprising:
receiving, at the server, from a transaction server, a purchasing history of the user of the first computer, said purchasing history including transactions made with and without offers.

9. The method of claim 1, further comprising:
rewarding the user of the first computer, who forwarded the offer to the second computer, upon redemption of said offer by the user of the second computer via decoding the encoded first and second offer identifiers.

10. A system for distributing an offer to a computer, comprising:
a server configured to (i) store offer preferences of a user of a first computer, (ii) identify a location of the first computer, and (iii) transmit a message including at least the offer to the computer,
wherein the offer, included in the transmission message, (i) is for the purchase of goods or services, (ii) meets the stored offer preferences of the user of the first computer, (iii) is encoded with an offer identifier corresponding to the user of the first computer, and (iv) is encoded with a second offer identifier corresponding to a user of a second computer when the offer is forwarded from the first computer to the second computer,
wherein upon redemption of the offer by a user of the second computer, the encoded first and second offer identifiers are decoded, and
wherein the server is further configured to identify the user of the first computer and the user of the second computer upon redemption of the offer by the user of the second computer and as a result of the decoding of the encoded first and second offer identifiers.

11. The system of claim 10, wherein the server is further configured to identify, in an account corresponding to the user of the first computer, redemption of the offer, wherein the identification is based on the encoded offer identifier.

12. The system of claim 10, wherein the server is further configured to identify, in an account corresponding to the user of the second computer, redemption of the offer, wherein the identification is based on the encoded second offer identifier.

13. The system of claim 10, wherein the server is further configured to identify a location of the first computer, wherein the offer is associated with a merchant, and wherein the first computer is proximate to the merchant.

14. The system of claim 10, wherein the identification of the location of the first computer includes using the Global Positioning System.

15. The system of claim 10, wherein the offer preferences of the user of the first computer include designation based on the purchasing history of the user of the first computer received from the transaction server.

16. The system of claim 10, wherein the offer preferences of the user of the first computer include demographic information of the user of the first computer.

17. The system of claim 10, further comprising:
a transaction server configured to store a purchasing history of the user of the first computer, said purchasing history including transactions made with and without offers.

18. A system for receiving an offer, comprising:
a first computer of a user configured (i) to receive a transmission message from a server, the transmission message including at least an offer for the purchase of goods or services that meets offer preferences of a user of the computer and (ii) to encode the offer with a first offer identifier corresponding to the user of the computer,
wherein the offer is further encoded with a second offer identifier corresponding to a user of a second computer when the offer is forwarded from the first computer to the second computer,
wherein upon redemption of the offer by a user of the second computer, the encoded first and second offer identifiers are decoded, and
wherein the user of the first computer and the user of the second computer are identified upon redemption of the offer by the user of the second computer and as a result of the decoding of the encoded first and second offer identifiers.

19. The system of claim 18, wherein the offer is associated with a merchant and wherein the first computer is proximate to the merchant.

20. The system of claim 18, wherein the offer preferences of the user of the first computer include designation based on the purchasing history of the user of the first computer.

21. The system of claim 18, wherein the offer preferences of the user of the first computer include demographic information of the user of the first computer.

22. A non-transitory computer-readable recording medium having a program stored thereon that causes a processor to execute the method of claim 1.

* * * * *